United States Patent
Barbas et al.

(10) Patent No.: US 10,783,124 B2
(45) Date of Patent: *Sep. 22, 2020

(54) DATA MIGRATION IN A NETWORKED COMPUTER ENVIRONMENT

(71) Applicant: International Business Machines Corporation, Armonk, NY (US)

(72) Inventors: Pedro M. Barbas, Dunboyne (IE); Konrad Emanowicz, County Kildare (IE); Gareth Jenkins, Dublin (IE); Enda McCallig, County Kildare (IE); Lei Pan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 15/833,339

(22) Filed: Dec. 6, 2017

(65) Prior Publication Data

US 2018/0137114 A1 May 17, 2018

Related U.S. Application Data

(63) Continuation of application No. 15/350,435, filed on Nov. 14, 2016, now Pat. No. 10,649,965.

(51) Int. Cl.
*G06F 16/00* (2019.01)
*G06F 16/21* (2019.01)
*H04L 29/08* (2006.01)

(52) U.S. Cl.
CPC ............ *G06F 16/214* (2019.01); *H04L 67/10* (2013.01)

(58) Field of Classification Search
CPC .................................................... G06F 16/254
See application file for complete search history.

(56) References Cited

U.S. PATENT DOCUMENTS

| | | |
|---|---|---|
| 7,418,441 B2 | 8/2008 | Hamel et al. |
| 7,868,789 B1 | 1/2011 | Binning et al. |
| 7,966,343 B2 | 6/2011 | Yang et al. |
| 8,028,270 B2 | 9/2011 | Garrett |
| 8,239,421 B1 | 8/2012 | Marwah et al. |
| 8,356,060 B2 | 1/2013 | Marwah et al. |
| 9,201,606 B1 | 12/2015 | Taylor et al. |

(Continued)

OTHER PUBLICATIONS

G. Graefe and L. Shapiro. Data compression and database performance. In ACM/IEEE-CS Symp. On Applied Computing pp. 22-27, Apr. 1991, 10 pages.

(Continued)

*Primary Examiner* — Hung Q Pham
(74) *Attorney, Agent, or Firm* — Robert Bunker; Edell, Shapiro & Finnan, LLC

(57) ABSTRACT

Data structures stored on a source database are migrated to a destination database in which the data are structured in a different format than that of the source database. Dictionaries are stored that are based on representations of the data structures stored on the source database that are formatted in other than the structural format used on the source database for the data structures. One of the data structures and a corresponding one of the dictionaries are transferred from the source database to a destination database. The transferred data structure is loaded onto the destination database in accordance with the transferred dictionary.

5 Claims, 4 Drawing Sheets

(56) References Cited

U.S. PATENT DOCUMENTS

| | | |
|---|---|---|
| 10,248,736 B1 | 4/2019 | Carroll et al. |
| 2002/0111945 A1 | 8/2002 | Young |
| 2003/0037031 A1 | 2/2003 | Birder |
| 2005/0253739 A1 | 11/2005 | Hu et al. |
| 2006/0059187 A1* | 3/2006 | Brown .................. H03M 7/30 |
| 2006/0184561 A1 | 8/2006 | Terada |
| 2007/0226203 A1 | 9/2007 | Adya |
| 2008/0140692 A1 | 6/2008 | Gehring |
| 2009/0292745 A1 | 11/2009 | Bose et al. |
| 2011/0029569 A1 | 2/2011 | Ganesh et al. |
| 2012/0054225 A1 | 3/2012 | Marwah et al. |
| 2012/0066263 A1 | 3/2012 | Wildermuth |
| 2012/0265726 A1 | 10/2012 | Padmanabhan |
| 2012/0319876 A1 | 12/2012 | Froemmgen |
| 2014/0279837 A1 | 9/2014 | Guo |
| 2014/0379636 A1 | 12/2014 | Lober et al. |
| 2015/0052157 A1 | 2/2015 | Thompson |
| 2015/0095796 A1 | 4/2015 | Kutz et al. |
| 2015/0213072 A1 | 7/2015 | Chen et al. |
| 2016/0070730 A1 | 3/2016 | Barber et al. |
| 2016/0140116 A1 | 5/2016 | Li |
| 2016/0171067 A1 | 6/2016 | Acker |
| 2018/0137112 A1 | 5/2018 | Barbas et al. |
| 2018/0137114 A1 | 5/2018 | Barbas |

OTHER PUBLICATIONS

J. Goldstein, R. Ramakrishnan, and U. Shaft. Compressing relations and indexes. In ICDE '98, 1998, pp. 370-379.

B. R. Iyer and D. Wilhite. Data compression support in databases. In VLDB '94, 1994, pp. 695-704.

T. Johnson. Performance measurements of compressed bitmap indices. In VLDB, 1999, pp. 278-289.

G. Ray, J. R. Haritsa, and S. Seshadri. Database compression: A performance enhancement tool. In COMAD, 1995, 20 pages.

M. Zukowski, S. Heman, N. Nes, and P. Boncz. Super-scalar ram-cpu cache compression. In ICDE, 2006, 12 pages.

List of IBM Patents or Patent Applications Treated As Related, Dec. 2017, 1 page.

* cited by examiner

DATA MIGRATION IN A NETWORKED COMPUTER ENVIRONMENT

CROSS-REFERENCE TO RELATED APPLICATIONS

This application is a continuation of U.S. patent application Ser. No. 15/350,435, entitled "DATA MIGRATION IN A NETWORKED COMPUTER ENVIRONMENT" and filed Nov. 14, 2016, the disclosure of which is incorporated herein by reference in its entirety.

BACKGROUND

1. Technical Field

Present invention embodiments relate to the field of database management in networked computer systems (e.g., cloud computing environments), and more particularly to data migration between databases in a networked computer environment.

2. Discussion of the Related Art

Cloud computing is a type of network-based computing that provides shared computer processing resources and data to computers and other devices on demand. A cloud computing model enables ubiquitous, on-demand access to a shared pool of configurable computing resources (e.g., computer networks, servers, storage, bandwidth, applications and services), which can be rapidly provisioned and released with minimal management effort. Cloud computing and storage solutions provide users and enterprises with various capabilities to store and process their data in third-party data centers that may be located far from the user—ranging in distance from across a city to across the world. Sharing resources via a cloud computing infrastructure achieves coherence and economy of scale, similar to a utility (like the electricity grid) over an electricity network.

At the heart of cloud computing is an infrastructure comprising a network of interconnected processing and storage nodes. A cloud computing infrastructure is an enhancement to predecessor grid computing infrastructures through the incorporation of one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud computing models promote application hosting and various data storage options. Challenges exist, however, in that many databases hosted in cloud computing infrastructures follow different data storage, access and compression paradigms. For example, columnar databases models traditionally use approximate Huffman encoding, prefix compression, and offset compression. Approximate Huffman encoding is a frequency-based compression that uses the fewest number of bits to represent the most common values. In other words, the most common values can be compressed the most. Columnar databases build column compression dictionaries as part of the initial load operation on a column-organized table. Conventional columnar database models require scanning the data twice, once for an initial analysis phase and once for the second phase, the load operation itself. The initial analysis phase may build histograms to track the frequency of data values across all columns, which consumes approximately 40% of overall data migration processing times. This means for pipes or other sources that can only be scanned once, columnar database models will create a copy of the data at the destination, a very time consuming process that requires a significant amount of disk space.

Compression in traditional database systems is well known to improve performance. Data compression dictionaries are data structures containing information by which a first data representation is transformed to a second data representation, with the second representation being smaller than the first representation (also known as the original representation). Many compression methods exist or have been proposed, including order-preserving string compression, hardware compatible data structures, data transformations, user candidate techniques, hybrid columnar tables, inverted index, and tuple map criterion. Accordingly, dictionaries created for different data structures, e.g., different structural formats of database tables, are quite different. Unfortunately, each distinct data structure cannot use the same compression dictionary.

Improving the resource utilization efficiency of data migration between different table representations, e.g., loading data from a source row based table to a destination column based table, remains an ongoing research and engineering topic in the field of databases and database management.

SUMMARY

According to one embodiment of the present invention, data structures stored on a source database are migrated to a destination database in which the data are structured in a different format than that of the source database. Dictionaries are stored that are based on representations of the data structures stored on the source database that are formatted in other than the structural format used on the source database for the data structures. One of the data structures and a corresponding one of the dictionaries are transferred from the source database to a destination database. The transferred data structure is loaded onto the destination database in accordance with the transferred dictionary.

BRIEF DESCRIPTION OF THE DRAWINGS

Generally, like reference numerals in the various figures designate like components.

DETAILED DESCRIPTION

Figure 1:
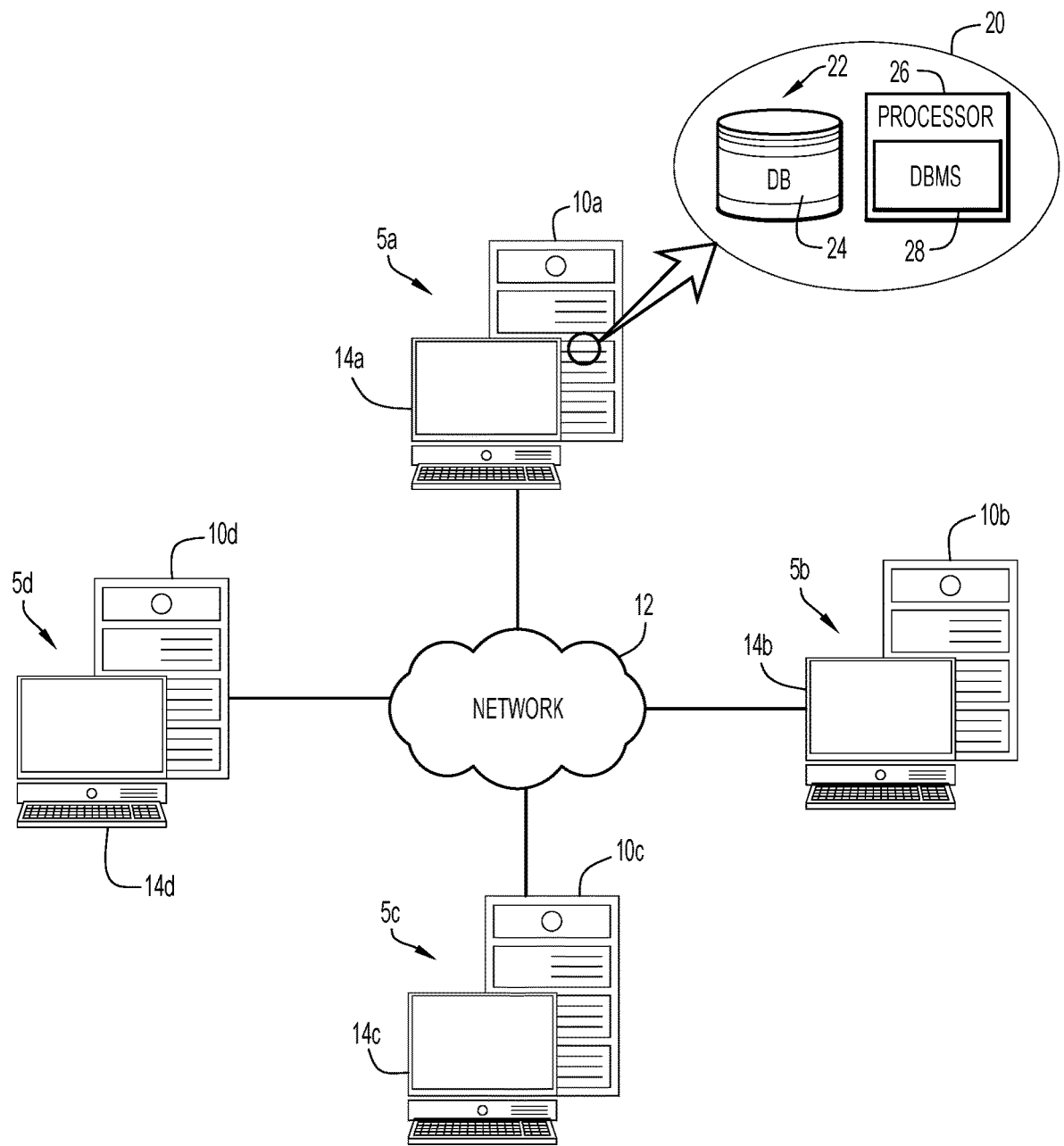
FIG. 1 is a diagram of an example environment in which the present invention can be embodied.

An example environment for use with present invention embodiments is illustrated in FIG. 1. Specifically, the environment includes one or more cloud computing centers 5a-5d, representatively referred to herein as cloud computing center(s) 5, each communicatively coupled one to another by a communications medium, such as communications network 12. Each cloud computing center 5 may comprise one or more server systems 10a-10d, representatively referred to herein as server system(s) 10, and one or more client or end-user systems 14*a*-14*d*, representatively referred to herein as client systems 14. Network 12 may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Server systems 10 may include processing resources 20, such as data storage equipment 22 and processor 26 that interoperate to realize a database 24 in data storage equipment 22 and a corresponding database management system (DBMS) 28 on processor 26. Processing resources 20 at each cloud computing center 5 may be communicatively coupled one to the others through network 12, by which data are conveyed from one cloud computing center to another, commands are issued, etc. Database 24 may store data structures, such as database tables, containing information of interest to a user or an enterprise and may be implemented by any conventional or other database or storage unit. DBMS 28 may communicate with other DBMSs 28 via any appropriate communication medium (e.g., local area network (LAN), wide area network (WAN), Internet, hardwire, wireless link, Intranet, etc.).

Client systems 14 may present a graphical user (e.g., GUI, etc.) or other interface (e.g., command line prompts, menu screens, etc.) to solicit information from users pertaining to data stored in database 24. Such information may include commands for manipulating the data stored in database 24 and/or commands for database management, including moving the data stored in one database 24 to another database 24. Client systems 14 may also provide reports including query results, command success results, and/or database management reports.

Server systems 10 and client systems 14 may be implemented by any conventional or other computer systems preferably equipped with a display or monitor, a base (e.g., including at least one processor 26, one or more memories or other data storage equipment 22 and/or internal or external network interfaces or communications devices (e.g., modem, network cards, etc., not illustrated), optional input devices (e.g., a keyboard, mouse or other input device), and any commercially available and custom software (e.g., server/communications software, browser/interface software, database management software, etc.).

The described method and system provides data migration optimizations between different data structure representations in a networked computer environment. It is to be understood in advance that although this disclosure includes cloud computing examples, implementation of the teachings recited herein are not limited to a cloud computing environment. Rather, embodiments of the present invention are capable of being implemented in conjunction with other types of computing environments.

As those skilled in database technology will attest, the content of a database is in continual flux. That is, informational objects, e.g., text, numbers, images, documents, etc., stored in a data structure such as a relational database table may be manipulated by insertion, removal, re-organization, etc. DBMS 28 may be constructed or otherwise configured to, among other things, manage the storage of data in database 24. For example, at certain cloud computing centers 5, storage of certain database tables is managed as sets of pages, where each page may contain a set of rows of a particular database table. Database tables that are stored in pages that contain such a set of rows is referred to herein as being in "row-major" format. In other cloud computing centers 5, database table storage may be managed in other than row-major order. For example, storage of certain database tables is managed as sets of pages, where each page may contain data across multiple rows of a specific column. Database tables that are stored in pages that contain such a set of rows spanning across one or more columns of a database table is referred to herein as being in "column-major" format. In contrast to a row-major table, in which a page contains all the column values of one or more rows, column-major tables are often used for complex, analytic query workloads that must process massive amounts of data, but require reading all the row data of only a small set of the table's columns. Column-major format affords reading all of the row data for only those columns that are referenced in a query or command, thus significantly reducing the time required to complete the query or command.

Both column-major tables and row-major tables can be further organized into range-partitioned tables, where each database partition is treated as an individual table, or into multidimensional clustering tables, where data is further organized by dimension. Each one of these table structure representations uses one or more dictionaries created for that data representation. Row-major tables may use a static dictionary-based compression technique to compress data, where up to two separate dictionaries are used, one for compression of the table rows, and another one for compression of extensible markup language (XML) documents if the table contains one or more XML columns stored in a default XML storage object. Column-store tables, on the other hand, utilize per-column dictionaries, allowing efficient compression of values in a column.

Figure 2:
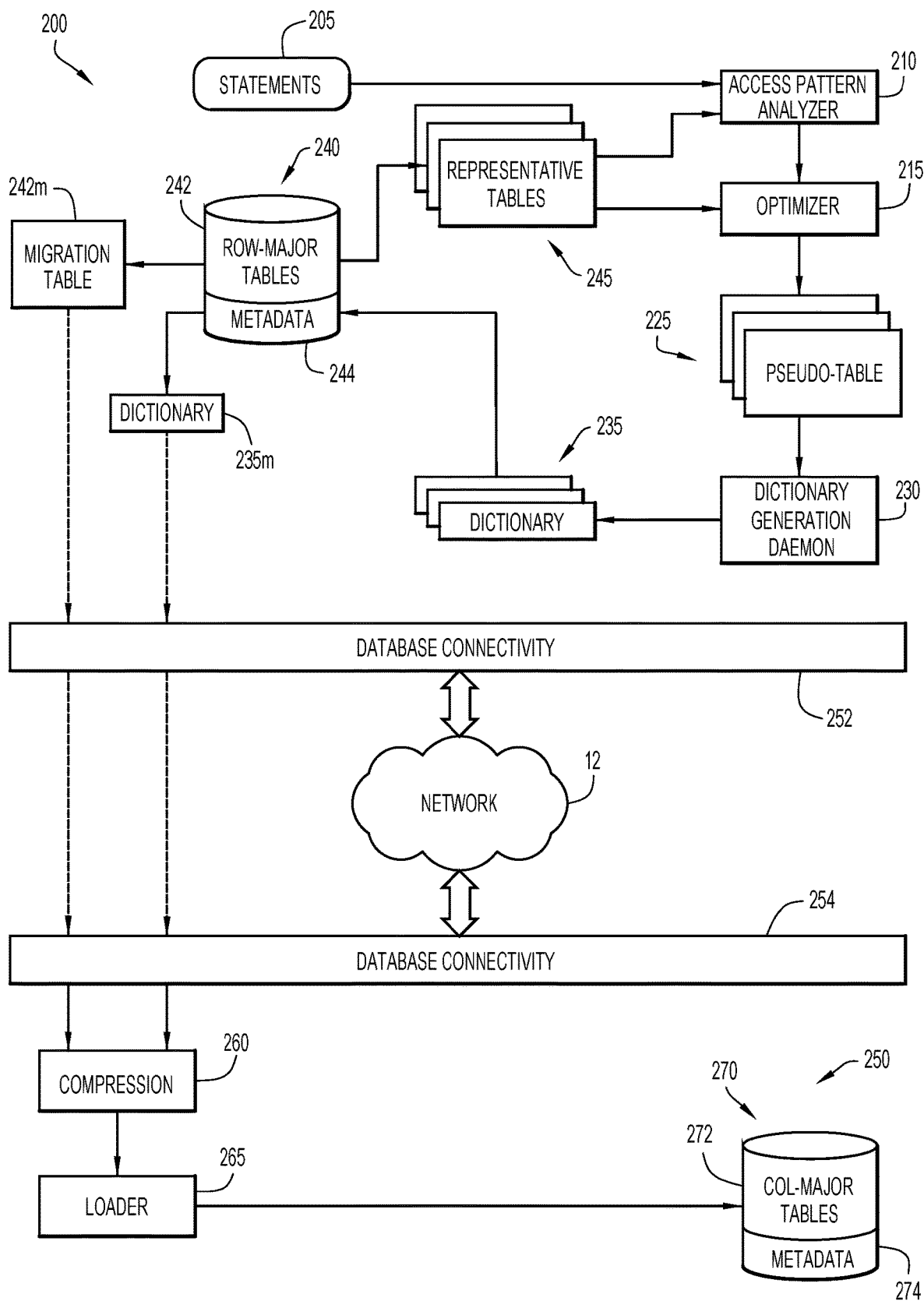
FIG. 2 is a schematic flow diagram of example data migration across database instances of embodiments of the present invention.

FIG. 2 is a schematic flow diagram of example data migration across database instances of embodiments of the present invention. As shown in the figure, the example data migration occurs between a source database instance 240 in database system 200 and a destination database instance 270 in database system 250 over a communication channel of communication network 12. As used herein, a "database instance" is a realization of a database to include, without being limited to, persistently stored database systems and copies of a database that are stored in volatile memory.

In the illustrated example, source database instance 240 stores data in row-major tables 242 and destination database instance 270 stores data in column-major tables 272. However, it is to be understood that other data structure formats may be used in either or both of source database instance 240 and destination database instance 270. It is to be understood as well that the components illustrated in source database system 200 may be included in destination database system 250 and vice-versa. When so embodied, source database system 200 may serve as destination database system 250, and vice-versa.

In certain embodiments, a set of database tables of row-major tables 242 are selected that are representative of the tables most likely to be moved from one database system to another. Representative tables 245 may be selected in a variety of ways including by analysis that determines the most accessed tables or by database administration operations that are based on business directives. In one embodiment, access pattern analyzer component 210 may track user statements specifying various database operations, such as data insertions, updates, and/or deletions (IUDs), LOAD operations or data reorganization operations on data stored in the selected database tables of source database instance 240. Using information generated by access pattern analyzer component 210, optimizer component 215 generates pseudo-tables 225 for the respective database tables that were analyzed. As used herein, a "pseudo-table" is a tabular data structure for which a conversion operation has been performed, but for which other data migration operations have not yet been fully effectuated, i.e., conveyed and loaded into another database. For example, a specific table in the identified set of database tables may be column oriented, in which case a possible pseudo-table structure representation would be a row-oriented table optimized in accordance with the set of user access patterns. In another example, consider a row-major table as an original source table and that IUD access patterns show that data accesses to the same data in query statements, e.g., BETWEEN, GROUP BY, ORDER BY, WHERE (equality, for example, REGION='NW' and inequality, for example, month<='April'), refer to specific date range fields. In this case, one possible pseudo-table representation would be a range-partitioned table optimized to partition data by the date range field, i.e., ORGANIZE BY date column START range END range. This same approach is also used to create different pseudo-tables, where each one of them is optimized by IUD access patterns. It is to be understood that pseudo-tables for other data structures and formats may be used in conjunction with the present invention without departing from the spirit and intended scope thereof.

Pseudo-tables 225 are representations of table data structures, but, in certain embodiments, contain no data. A pseudo-table 225 is a different variation of a base table so that the data that are being conveyed from one database to another can be structured in a different way. In certain embodiments, a view on a base table from a destination database management system can be done using restructured data without incurring in extra duplication of data.

Dictionary generation daemon 230 may analyze pseudo-tables 225 and produce compression dictionaries 235 for the representative tables 245 of source database instance 240 based on the corresponding pseudo-tables 225. Dictionary generation is the process of identifying common patterns in the set of source data through the analysis of the user access patterns in the data structure, e.g., by data frequency in RANGE, IN, BETWEEN, GROUP BY, ORDER BY, WHERE predicates of the workload and masked patterns. The dictionary implements a mapping from a pattern to a corresponding symbol, and vice versa, through encoding and decoding, respectively. Dictionaries 235 may be implemented in metadata and stored in metadata store 244. It is to be understood that while metadata stores are illustrated as being components of respective database instances, the present invention is not so limited. Metadata store 244 may be realized in a store or memory location that is separate from the database instance 240. For example, when database instances are in-memory copies of a single database, a single metadata store may be maintained in persistent storage and be utilized by all of the database copies.

In certain embodiments, dictionaries 235 are maintained in a continually updated state by dictionary generation daemon 230, which may implement an asynchronous automatic dictionary creation and maintenance process. Since relevance of data can change over time, dictionary generation daemon 230 may be activated periodically to analyze the set of user access patterns by querying the database for relevant data and to compute dictionaries 235 from that data, which may then be stored in metadata store 244. Dictionaries and/or other metadata (including metadata relating to stored dictionaries) for one or more tables of a database may be stored in metadata store 244, which may also store system catalog tables comprised within the database itself. Dictionaries and optionally other metadata contained in metadata store 244 may be loaded into another store, such as metadata store 274 or a metadata cache.

In certain embodiments, source database system 200 and destination database system 250 may implement a database connectivity application programming interface (API) through database connectivity component 252 on source database system 200 and database connectivity component 254 on destination database system 250. Those having skill in distributed database technology will recognize and appreciate that database connectivity components 252 and 254 afford access to database management systems 28 over network 12 for purposes of, for example, application-layer database operations such as database queries and database data migration operations. Database connectivity components 252 and 254 may be realized in various open-source, commercial and/or proprietary processor-executable products such as the Open Database Connectivity (ODBC) and Java Database Connectivity (JDBC) platforms. In certain embodiments, data access patterns that determine relevancy include calls made through database connectivity APIs.

At load time, i.e., when database data in source database instance 240, representatively illustrated as migration table 242m, is conveyed to and incorporated in destination database instance 270, destination database system 250 may request the most recently created or updated dictionary 235, representatively illustrated as dictionary 235m, from source destination database system 200. This operation may be triggered by a user command where, first, the desired table structure is created on the destination database. The dictionary may then be requested from the source database that is consistent with the table structure defined on the destination database. The requested dictionary may be retrieved and used to load the data into the destination database.

Dictionary 235m contains information by which migration table 242m is structurally transformed, e.g., from row-major format to column-major format, and compressed using results of the access pattern analysis performed on source database instance 240. Dictionary 235m may be conveyed to a data compression component 260 on destination database system 260, which is constructed or otherwise configured to carry out the data compression on the data in migration table 242m based on the corresponding dictionary 235m. Loader 265 in destination database system 250 loads the compressed migration table 242m into destination database instance 270 in the appropriate structural format, e.g., column-major format of column-major tables 272 of destination database instance 270.

Figure 3A:
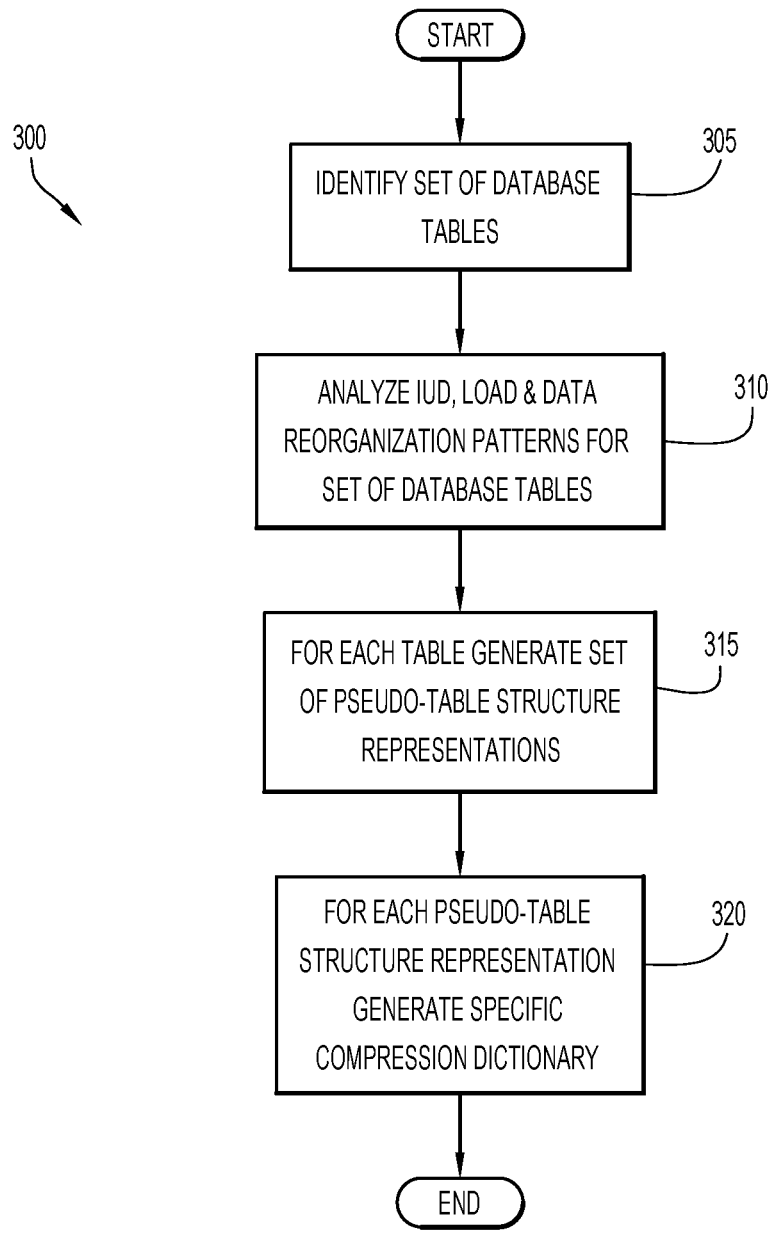
FIG. 3A is a flow diagram of a dictionary generation process by which the present invention can be embodied.

FIG. 3A is a flow diagram of an example dictionary generation process 300, which may be performed on source database system 200. In operation 305 of process 300, a plurality of representative database tables are identified that are most likely targeted for data migration operations. Toward that end, process 300 analyzes a set of user access patterns in operation 310, e.g., user statements specifying data insertions, updates, and/or deletions (IUDs), LOAD operations or data reorganization operations on the data stored in the database tables identified in operation 305. In operation 315, the user access pattern set is used to generate different pseudo-tables representing the identified tables. That is, each pseudo-table can represent a different table structure. For example, a row-based table of the original table set can have column based, range partitioned and multi dimensional clustered pseudo-table representations. Other variations are possible for different database systems, as those having skill in the art will recognize. Once all of the possible pseudo-tables have been determined for each of the identified tables in the database system, process 300 transitions to operation 320 by which a dictionary is generated for each of the pseudo-tables.

Figure 3B:
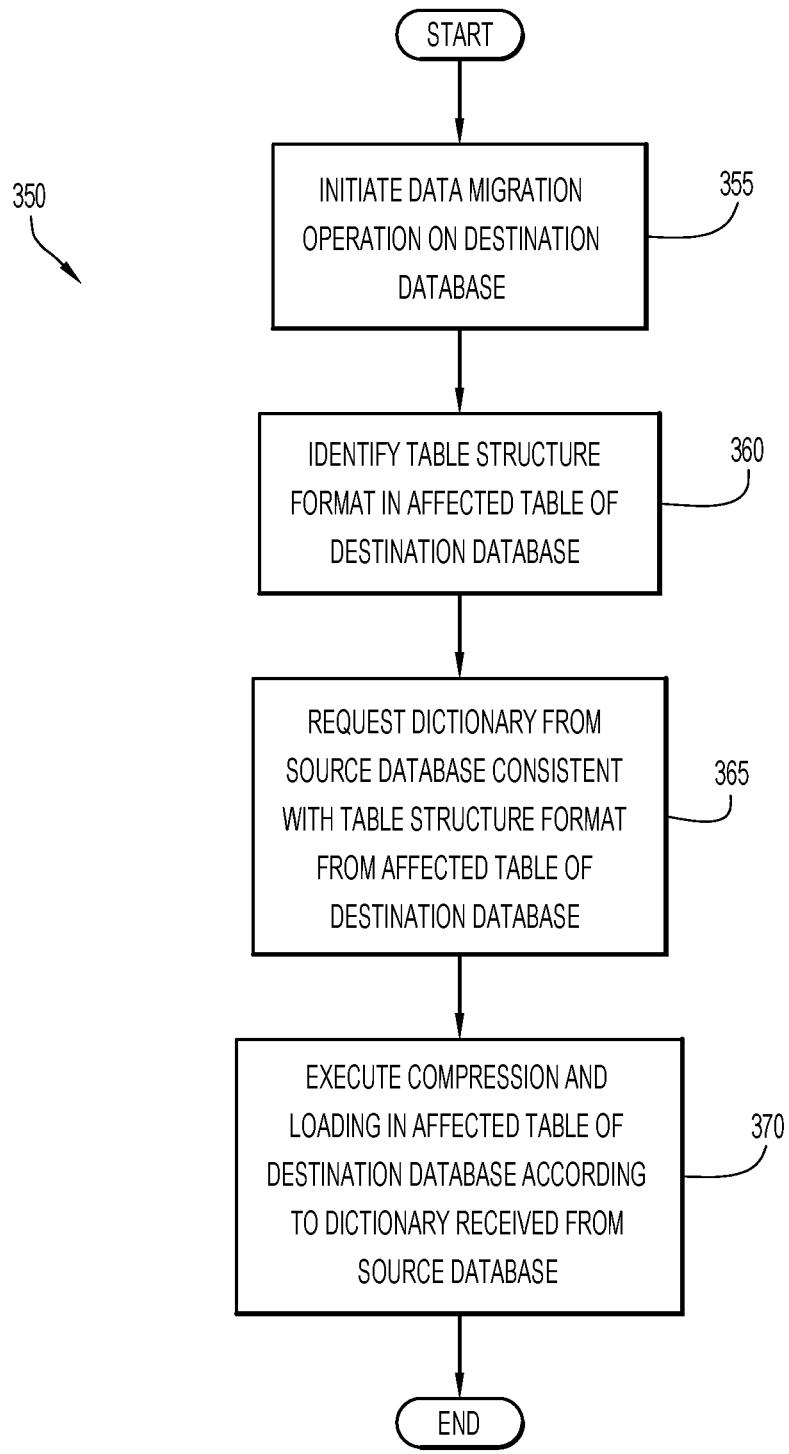
FIG. 3B is a flow diagram of a data loading process by which the present invention can be embodied

FIG. 3B is a flow diagram of an example destination data loading process 350, by which data are loaded into a destination database by reading input data from a data source, e.g., migration table 242m, requesting a dictionary for the table structure in use by the destination database (e.g., column-major format), compressing the input data, and storing the compressed input data in pages of the database.

In operation 355 of data loading process 350, a data migration operation is initiated, such as by a user command, from the destination database system or, alternatively, from the source database system. In operation 360, the structural format of the destination database instance (e.g., column-major format) is identified for the specific table that is being loaded in the destination database instance. In operation 365, a dictionary is requested from the source database that is consistent with the identified table structure format in the destination database. For example, if the original table structure format in the source database is a row-major format and the table structure format in the destination database is a column-major format, then the dictionary that is requested and utilized is that for the column-major format and is based on the pseudo-table representation of the original table structure format in the source database. Process 350 may finalize the data migration in operation 370 by executing the data compression on the migration table using the compression techniques in the dictionary and loading the data from the migration table in accordance with loading parameters and/or characteristics specified in the requested dictionary, e.g., cardinality of the data, specific string patterns, null values, etc.

In some embodiments, the destination database may be a column-group-store database, in which each page contains the values of one or more columns. A column-group-store database is a hybrid of a row-store and a column-store database, in which the columns of a table are partitioned into a one or more of column groups, each of which may contain one or more columns and thus a larger portion of each row.

Data migration time may be reduced in embodiments of the present invention by exploiting the pre-generated dictionary technique described above. In conventional cloud computing environments, an analysis phase is a component of the data-loading process, by which the characteristics of the input data are analyzed to determine appropriate compression techniques and characteristics to use for data loading. During the analysis phase, the data-loading system on the destination server system processes the input data to determine frequencies of the distinct values in each column. The resulting frequency information is then recorded in per-column histograms, with each histogram maintaining the frequency information for a respective column. After the analysis phase, the actual compression and loading may be performed using the selected compression techniques and characteristics determined during the analysis phase. By contrast, embodiments of the present invention suppress the analysis phase, which results in an overall performance improvement of 40% of the total data movement process.

It will be appreciated that the embodiments described above and illustrated in the drawings represent only a few of the many ways of implementing embodiments for data migration in distributed computing environments such as cloud computing infrastructures.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, DBMS software, etc.). These systems may include any types of monitors and input devices (e.g., keyboard, mouse, voice recognition, etc.) to enter and/or view information.

DBMS 28 may include one or more components or units to perform the various functions of present invention embodiments described herein. The various components (e.g., access pattern analysis component 210, optimizer component 215, dictionary generation daemon 230, database connectivity components 252 and 254, compression component 260 and loader component 265) may be implemented by any combination of any quantity of software and/or hardware modules or units, and may reside within data storage equipment 22 of the server and/or client systems for execution by processor 26.

It is to be understood that the software (e.g., DBMS 28, dictionary generation process 300, data loading process 350, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various cloud computing centers, end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., DBMS 28, dictionary generation process 300, data loading process 350, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

Each database system described herein may be implemented by any number of any conventional or other databases, data stores or storage structures (e.g., files, databases, data structures (e.g., database tables), data or other repositories, etc.) to store information objects described above. Each database system may be included within or coupled to the server and/or client systems. The database systems and/or storage structures may be remote from or local to the computer or other processing systems, and may store any desired data (e.g., text, numbers, images, etc.).

The present invention embodiments may employ any number of any type of user interface (e.g., Graphical User Interface (GUI), command-line, prompt, etc.) for obtaining or providing information (e.g., database data, database commands, queries, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., query results, command success results, data migration results, etc.).

The present invention embodiments are not limited to the specific tasks or algorithms described above, but may be utilized for compressing and loading data structures into data storage equipment utilizing different data structure storage formats.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for migrating data structures stored on a source database to a destination database, the method comprising:
   generating, via one or more processors, a plurality of representations for a data structure stored on the source database based on access patterns for the data structure on the source database, wherein each representation corresponds to a different structural format than a structural format of the data structure on the source database;
   generating, via the one or more processors, a plurality of dictionaries, wherein each of the plurality of dictionaries corresponds to a representation for the data structure from the plurality of representations, and wherein each of the plurality of dictionaries is used to convert the data structure to the different structural format of the representation for the data structure corresponding to each of the plurality of dictionaries;
   in response to a request from a destination database system for a dictionary of a corresponding structural format for a target data structure of the destination database, transferring, via the one or more processors, the data structure and the requested dictionary of the corresponding structural format from the source database to the destination database system; and
   loading, via the one or more processors, the transferred data structure onto the destination database in the corresponding structural format for the target data structure in accordance with the transferred dictionary.

2. The method of claim 1, further comprising:
   analyzing, via the one or more processors, user database statements for the data structure to form the plurality of representations of the data structure; and
   generating, via the one or more processors, the plurality of dictionaries from the formed plurality of representations of the data structure.

3. The method of claim 2, further comprising:
   including in the plurality of dictionaries via the one or more processors:
      instructions for formatting the transferred data structure into the different structural formats of the representations for the data structure corresponding to the plurality of dictionaries; and
      instructions for compressing the transferred data structure.

4. The method of claim 2, further comprising:
   updating, via the one or more processors, the plurality of dictionaries continually to specify compression operations based on user database statements for the source database as submitted over time.

5. The method of claim 1, further comprising:
   determining, via the one or more processors, the corresponding structural format of the target data structure stored on the destination database; and
   requesting, from the source database via the one or more processors, a dictionary of the determined corresponding structural format of the target data structure stored on the destination database.

* * * * *